United States Patent [19]

Katou et al.

[11] Patent Number: 5,373,404
[45] Date of Patent: Dec. 13, 1994

[54] HELICAL SCAN TYPE ROTARY HEAD DRUM UNIT

[75] Inventors: Daiichirou Katou; Hitoshi Yanagisawa; Takuji Sekiguchi, all of Tokyo; Toshihiko Okina, Komagane; Kazuo Kobayashi, Shimosuwa, all of Japan

[73] Assignee: Kabushki Kaisha Sankyo Seiki Seisakusho, Japan

[21] Appl. No.: 143,292

[22] Filed: Oct. 26, 1993

Related U.S. Application Data

[63] Continuation of Ser. No. 640,411, Jan. 22, 1991, abandoned.

[30] Foreign Application Priority Data

May 22, 1989 [JP] Japan .................. 1-126666

[51] Int. Cl.⁵ .................. G11B 5/596; G11B 5/02; G11B 15/14; G11B 5/027
[52] U.S. Cl. .................. 360/77.02; 360/55; 360/64; 360/73.03; 360/78.04; 360/78.11; 360/84
[58] Field of Search .......... 360/77.02, 78.04, 78.11, 360/84, 55, 64, 73.03

[56] References Cited

U.S. PATENT DOCUMENTS

| | | | |
|---|---|---|---|
| 4,511,934 | 4/1985 | Ohira et al. | 360/55 |
| 4,581,662 | 4/1986 | Sato | 360/75 |
| 4,614,985 | 9/1986 | Tsuruta | 360/64 |
| 4,967,290 | 10/1990 | Grant et al. | 360/64 |
| 5,051,851 | 9/1991 | Sakurai | 360/77.06 |

FOREIGN PATENT DOCUMENTS

| | | |
|---|---|---|
| 60-11043 | 6/1985 | Japan . |
| 60-106233 | 7/1985 | Japan . |
| 62-32345 | 8/1987 | Japan . |
| 62-42335 | 9/1987 | Japan . |
| 62-56568 | 11/1987 | Japan . |
| 284104 | 6/1990 | Japan . |
| 2117710 | 9/1990 | Japan . |

*Primary Examiner*—Timothy P. Callahan
*Assistant Examiner*—Trong Phan
*Attorney, Agent, or Firm*—Welsh & Katz, Ltd.

[57] ABSTRACT

The present invention relates to a rotary drum unit in a helical scan type magnetic recording/reproducing device for use with a video tape recorder, digital audio tape recorded, or the like and is intended to permit the stable run of the tape with highly accurate formation of track patterns. In the helical scan type rotary head drum unit of the present invention, a dislocation of the tape upon the drums having no lead is detected by tape position sensors arranged along a guide line and the rotary head is moved in the axial direction of the drum by driving a dynamic tracking actuator in a manner to correct the deviation of the tape from the guide line.

4 Claims, 3 Drawing Sheets

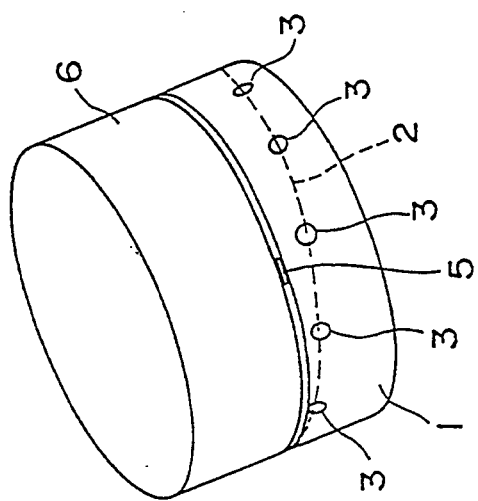
FIG. I
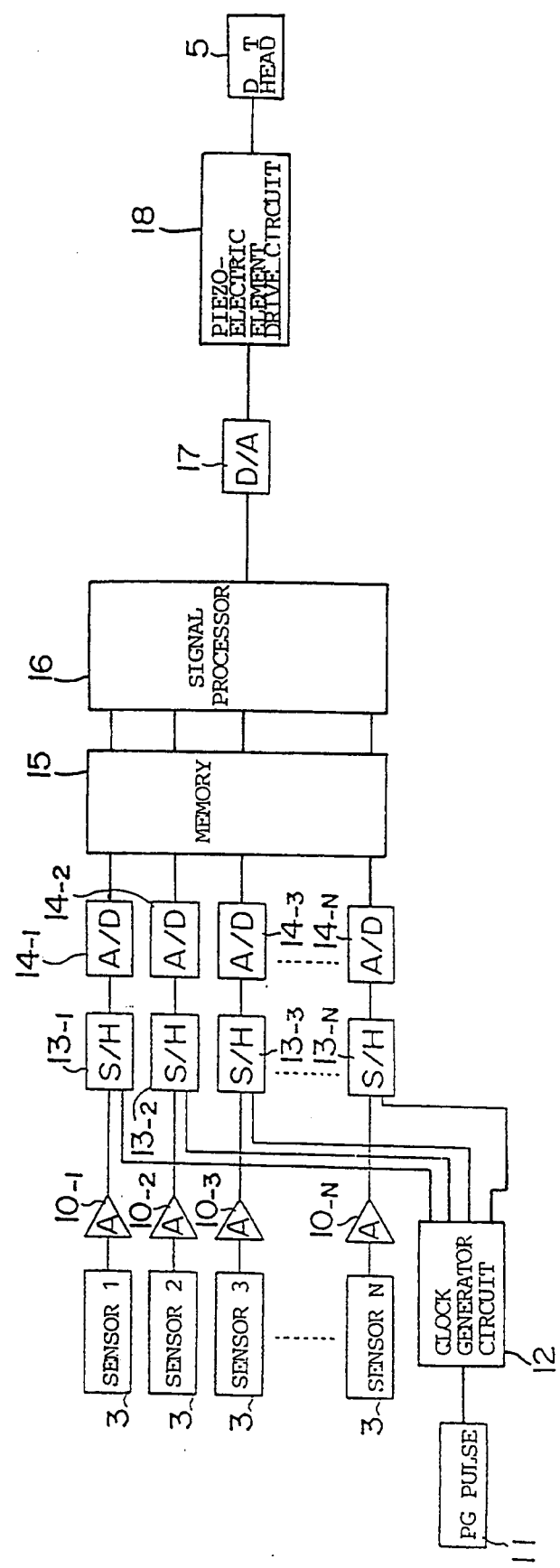
FIG. 3

HELICAL SCAN TYPE ROTARY HEAD DRUM UNIT

This is a continuation application of application Ser. No. 640,411, filed Jan. 22, 1991, which is now abandoned.

TECHNICAL FIELD

The present invention relates to a rotary drum head unit in a helical scan type magnetic recording/reproducing device for use in a video tape recorded, digital audio taper recorder, or the like. The invention is particularly directed to a tape drive system in the rotary drum head unit which calls for a reproducible tracking by the tape and a high accurate tracking pattern on the tape.

According to convention helical scan type magnetic recording/reproducing devices employed in video tape and digital audio tape recorders, the formation of tracking patterns on the tape is attained by a rotary head wherein the edge of the tape is guided to run along the lead of the rotary head drum by physically controlling the position of the tape on the drum.

However, since the position of the tape on the rotary drum is physically controlled by holding the tape edge along the edge of the drum, there is a possibility that when the tape position deviates sufficiently in the tape transport system, the drum edge causes nonlinear friction at the tape edge, which makes the tape run in an unstable manner, giving rise to a jitter, or worse inflicting damage to the tape edge. This phenomenon is noted frequently with the tendency toward an increasingly reduced thickness of the tape, thereby creating an obstacle against thinner tape for more recording capacity as well as against the narrow formation of tracks for high density recording, for which demands have grown recently.

SUMMARY OF THE INVENTION

It is therefore an object of the present invention to provide a rotary drum head unit which ensures stable tape tracking on the head without damage thereto while permitting formation of highly accurate track patterns.

To achieve such an object according to the present invention in a helical scan type rotary drum head unit having a dynamic tracking control system, in which an actuator is driven to cause a rotary head to move axially relative to the drum, a plurality of position sensors are disposed along a guide line corresponding to the standard running position of a bottom or top of the tape upon the drum. The deviation of the tape edge from the guide line is detected by the position sensors and responsive to signals from the sensors, the actuator for dynamic tracking is driving to move the rotary head axially relative to the drum, thereby correcting the running position of the rotary head relative to the tape edge.

Thus, any deviation of the tape from the proper track pattern on the drum will be detected by sensors, which in response, will emit a signal to the actuator for dynamic tracking, which then moves the rotary head axially relative to the drum. The rotary head is thus displaced the distance necessary to position the tape edge along the guide line on the drum.

Accordingly, even in the case of a thin tape having no rigidity and thus difficult to mechanically control its position, the present invention can be used, assuring extremely a stable and accurate tape run and permitting the formation of track patterns with high precision without inflicting any damage to the tape or disturbing the movement of the tape.

BRIEF DESCRIPTION OF THE DRAWINGS

FIG. 1 is a perspective view illustrating an embodiment of a rotary head drum unit in accordance with the present invention;

FIG. 3 is a block diagram illustrating an embodiment of a control system; and

BEST MODE FOR CARRYING OUT THE INVENTION

Figure 2A:
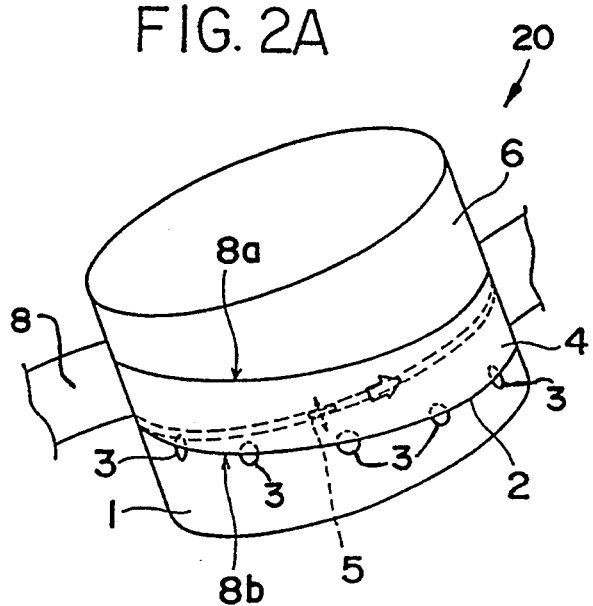
FIG. 2a is a perspective view showing the travel of the tape around the rotary drum unit depicted in FIG. 1.

The constitution of the present invention will hereinafter be described in detail with reference to the embodiments shown in the drawings.

FIG. 1 illustrates, in perspective, one embodiment of the present invention, comprising a rotary head drum unit 20 having a rotary head 5, which is a dynamic tracking head fixed to the upper rotary drum 6 and is driven as a unitary structure therewith through a dynamic tracking actuator (not shown). In accordance with the present invention, a plurality of sensors 3 are embedded in its lower drum 1 along guide lines 2, for detecting the position of the lower edge 8b of a tape 4 (FIG. 2a). The guide line 2 mentioned herein is indicative of the position where the tape edge 8a should be located on the drum head 1 during a standard running of the tape 4.

The position sensors 3 comprise photosensors such as photodiodes, and detect the position of the tape edge 8a, sensitive to light received by them from a light source (not shown) disposed about the drum head when the light is fully blocked or fully exposed by the movement of the tape over the drum head and/or the sensors 3; the light transmission, or lack thereof is detected by the sensors, indicating that the tape position is awry.

The surfaces of the photosensors may be treated to avoid any adverse effect upon the tape running behavior. The output of the photosensors (light receiving elements) 3 is fed back to the dynamic tracking actuator for control of the axial displacement of the rotary head 5. In other words, in the event that the position of the tape is outside the standard tracking path as detected by the photosensors 3, the head 5 is moved axially to the position where the tape 4 ought to run along the guide line 2, thereby offsetting the misplacement of the tape 4 running on the lower drum 1 with respect to the guide line 2. The dynamic tracking actuator is usually a piezoelectric element; known dynamic tracking heads are disclosed in, for example, the Japanese Patent Publication Nos. 56568/87 and 42335/87, the Japanese U.M. Publication No. 32345/87.

Figure 2B:
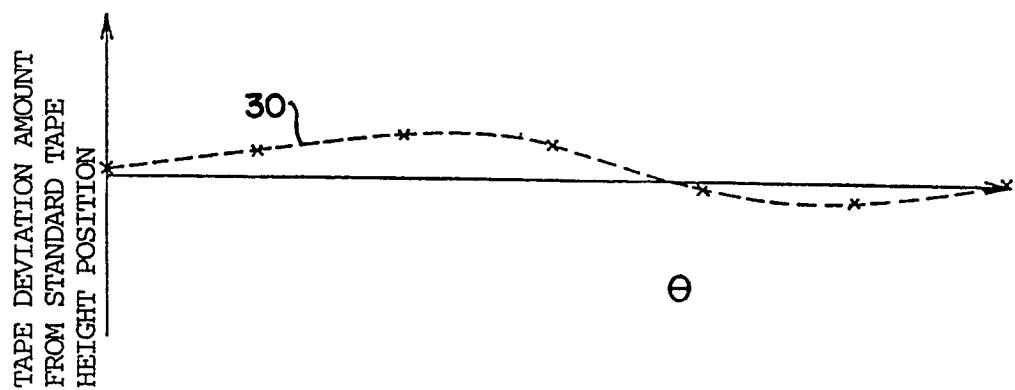
FIG. 2b is a graph showing a locus drawn by the rotary head.

With the rotary head drum unit constructed as above, and referring to FIG. 2b, as the tape 4 travels about the rotary head 5 along guide line 2 the photosensors being responsive to any deviation in the position of the tape edge 2a from the guide line 2 sends a signal indicative of such a change in the position of the tape to control the dynamic tracking actuator associated with the head 5, whereby the head 5 is moved upwardly or downwardly, as appropriate. This action can be depicted in FIG. 2b by the line 30 passing through points x representing the photosensors 3, as the tape runs from start point to finish point, or through angle $\theta$ on the drum head.

FIG. 3 illustrates an embodiment of the control system of the subject invention. Each change in position of the tape 4 from the standard tape height position or guide line 2, which is detected by the sensors 3 is amplified by means of amplifiers $10_{-1}, 10_{-2}, \ldots, 10_{-N}$, respectively. The thus-amplified outputs, representing the changes in tape position, are sampled and held in sample-and-hold circuits $13_{-1}, 13_{-2}, 13_{-3} \ldots, 13_{-N}$, in accordance with a clock which is generated by a clock generator 12 in synchronism with one or two pulses from a drum pulse generator 11. The pulses are produced from the rotation of the rotary head 5 and represent the standard rotation position of the rotary head 5. Then, the outputs in the sample-and-hold circuits are transformed into digital signals by means of the A/D converts, $14_{-1}, 14_{-2}, 14_{-3}, \ldots, 14_{-N}$, and thereafter stored in memory 15. Depending on the tape position data, a high-order interpolation is performed by signal processor 16 to produce a control signal for driving the dynamic tracking piezoelectric element. The control signal is sent through D/A converter 17 and piezoelectric element drive circuit 18 so as to cause the head 5 to move up or down. In this connection, the timing for sampling and holding each sensor output may be delayed according to the actual condition of operation, and a linear interpolation or other similar interpolation methods may also be employed in the signal processor 16.

Figure 4:
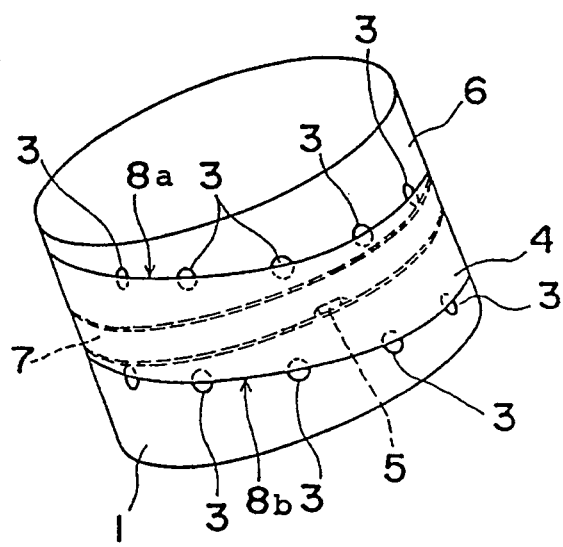
FIG. 4 is a perspective view illustrating another embodiment of the mechanism of the present invention as applied to a drum head unit of the type rotating about an intermediate drum.

FIG. 4 illustrates another embodiment of the present invention applied to a rotary drum unit of the type in which a rotary head drum 7 is interposed between the upper and lower drums 1 and 6 which are stationary. In both of the lower and upper drums 1 and 6, there are embedded photosensors 3, along the guide line 2 so that a differential output is obtained, using upper and lower edges 8a, 8b of the tape to provide for increase accuracy in sensing the position of the tape 8. The rotary head 5 is coupled to a rotary head drum 7 through the dynamic tracking actuator.

While in the above the present invention has been described with reference to its preferred embodiments, the invention is not limited specifically thereto but various modifications may be effected without departing from the scope of the subject matter of the invention. For example, in the above-described embodiments the photosensors 3 are embedded in the drums 1 and 6, but this should not be construed as limiting the invention and, though not shown, it is also possible to employ an arrangement wherein position sensors, for example, reflecting type photosensors are disposed outside of the drum 1 or 6 in an opposing relation with the guide line 2, and the tape 4 runs in the space between the photosensors 3 and the drums 1, 6. In this embodiment, each of the reflecting-type photosensors has a light receiving element and a light emitting element disposed facing toward the boundary between the tape edge 8 and the peripheral surface of the drum in such a manner that the light receiving and emitting elements are axially symmetrical with respect to a line passing through a certain point on the guide line 2 and the axis of the drum. With such arrangement, any variations in reflected light at the boundary between the tape edge 8 and the peripheral surface of the drum may be sensed by those elements to detect the position of the tape edge 8. This arrangement is also applicable to a rotary head drum unit of the type rotating the upper drum 6 in order to permit the detection of movement of the tape edge 8 upon the upper drum 6.

Sensors 3, which detect the position of the tape edge, may be formed using MR elements, CCD line sensors, or other similar sensors.

INDUSTRIAL APPLICABILITY

The present invention is particularly suitable for use with a rotary drum unit in a tape drive system which calls for a stable tape run and highly accurate formation of track patterns, such a required in a helical scan type magnetic recording/reproducing device which is used for a thin tape transport or for broadcasting purpose.

We claim:

1. A helical scan type rotary drum unit based on a dynamic tracking control system, in which an actuator for dynamic tracking control is driven to cause a rotary head mounted to a drum to move in an axial direction of said drum, characterized in that a plurality of position sensors are disposed along a guide line corresponding to a standard position of at least one edge of a tape upon said drum, said position sensors capable of detecting a change in position of said tape from said standard position and emitting a signal corresponding to said change in position, said signal being received by said actuator and driving said rotary head in the axial direction of said drum in response thereto, thereby correcting the position of said rotary head to return said tape to said standard position.

2. The helical scan type rotary drum unit as set forth in claim 1, characterized in that said rotary head is mounted on a rotary drum means and said rotary drum means is disposed between upper and lower stationary drum means.

3. The helical scan type rotary drum unit as set forth in claim 1, characterized in that said drum includes an upper stationary drum means and lower stationary drum means, that said rotary head is rotatable between said upper and lower stationary drum means, that said guide line including an upper guide line and a lower guide line, that said plurality of position sensors comprise a first set of position sensors disposed in a peripheral surface of said upper stationary drum means along said upper guide line and a second set of position sensors disposed in a peripheral surface of said lower stationary drum means along said lower guide line, and when said tape is deviated from said guide line, said first position sensors differs from those of said second position sensors, thus creating a difference of output therebetween and said outputs are processed by said circuit so as to drive said actuator on basis of said difference of said outputs to move said rotary head in the axial direction of said drum in such a way as to compensate for said tape deviation amount and keeping scanning said tape correctly, while said tape is running.

4. The helical scan type rotary drum unit as set forth in claim 1, characterized in that said drum includes an upper stationary drum means and lower stationary drum means, said rotary head being rotatable between said upper and lower stationary drum means, said guide line including an upper guide line and a lower guide line, said plurality of position sensors comprising a first set of position sensors disposed on a peripheral surface of said upper stationary drum means along said upper guide line and a second set of position sensors disposed on a peripheral surface of said lower stationary drum means along said lower guide line, whereby said first and second position sensors detect said change in position of said tape and send the corresponding outputs to said actuator to move said rotary head in the axial direction of said drum in such a way to compensate for said change in position of said tape.

* * * * *